United States Patent
Snyder et al.

(10) Patent No.: US 12,455,381 B2
(45) Date of Patent: Oct. 28, 2025

(54) DEPLOYMENT OF TIME OF FLIGHT SENSOR ON CAMERA

(71) Applicant: CISCO TECHNOLOGY, INC., San Jose, CA (US)

(72) Inventors: Ian Matthew Snyder, San Francisco, CA (US); Nicholas Dye Abalos, San Francisco, CA (US); Ramkrishna Swamy, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 481 days.

(21) Appl. No.: 17/938,301

(22) Filed: Oct. 5, 2022

(65) Prior Publication Data
US 2024/0118420 A1   Apr. 11, 2024

(51) Int. Cl.
| | | |
|---|---|---|
| *G01S 17/89* | (2020.01) | |
| *G01S 7/48* | (2006.01) | |
| *G01S 17/86* | (2020.01) | |
| *G06T 7/292* | (2017.01) | |
| *G06T 7/73* | (2017.01) | |
| *G06V 20/52* | (2022.01) | |
| *G06V 20/64* | (2022.01) | |

(52) U.S. Cl.
CPC ............ *G01S 17/89* (2013.01); *G01S 7/4802* (2013.01); *G01S 17/86* (2020.01); *G06T 7/292* (2017.01); *G06T 7/73* (2017.01); *G06V 20/64* (2022.01); *G06T 2207/10028* (2013.01); *G06T 2207/20081* (2013.01)

(58) Field of Classification Search
None
See application file for complete search history.

(56) References Cited

U.S. PATENT DOCUMENTS

| 10,262,238 B2 * | 4/2019 | Briggs | G06V 10/147 |
| 11,335,018 B1 * | 5/2022 | Zhang | G06T 7/238 |

(Continued)

FOREIGN PATENT DOCUMENTS

| CN | 111489380 A | * | 8/2020 | | G06T 7/292 |
| CN | 112149687 A | * | 12/2020 | | G06F 18/214 |

(Continued)

OTHER PUBLICATIONS

"Respective." dictionary.cambridge.org. Cambridge Dictionary, 2025. Web. https://dictionary.cambridge.org/dictionary/english/respective. Mar. 3, 2025. (Year: 2025).*

*Primary Examiner* — Amandeep Saini
*Assistant Examiner* — Caroline Tabancay Duffy
(74) *Attorney, Agent, or Firm* — Polsinelli P.C.

(57) ABSTRACT

Systems and methods for camera height detection include a time of flight (TOF) sensor included on a camera within a camera array that emits a signal in an array of points. After receiving a reflected signal at the TOF sensor, where the reflected signal is a bounce back of the emitted signal from at least a subset of the array of points, a distance to each respective point in the array is determined based on a time it takes to receive the reflected signal from each respective point in the array. A depth map is generated from each respective point, where the depth map provides distance measurements to objects within an environment of the camera. A vertical position of the camera is determined based on the depth map.

17 Claims, 7 Drawing Sheets

(56) References Cited

U.S. PATENT DOCUMENTS

| | | | |
|---|---|---|---|
| 2011/0205340 A1* | 8/2011 | Garcia | G01S 17/08 |
| | | | 348/46 |
| 2012/0194644 A1 | 8/2012 | Newcombe et al. | |
| 2017/0262768 A1 | 9/2017 | Nowozin et al. | |
| 2019/0158813 A1 | 5/2019 | Rowell et al. | |
| 2019/0378294 A1 | 12/2019 | Zhang et al. | |
| 2020/0098122 A1* | 3/2020 | Dal Mutto | H04N 23/60 |
| 2020/0309898 A1* | 10/2020 | Boutaud | G01S 17/894 |
| 2022/0244740 A1* | 8/2022 | Jiang | G06T 7/579 |

FOREIGN PATENT DOCUMENTS

| | | | |
|---|---|---|---|
| CN | 114299291 A * | 4/2022 | |
| WO | 2022111017 | 6/2022 | |

\* cited by examiner

DEPLOYMENT OF TIME OF FLIGHT SENSOR ON CAMERA

TECHNICAL FIELD

The subject matter of this disclosure relates in general to the field of camera systems, and more particularly, to determinations of camera height based on time of flight (TOF) sensor systems.

BACKGROUND

Cameras with fisheye camera lenses are often deployed on a ceiling or structure above a region of a scene, which is then recorded by the cameras. However, the position of each camera is generally not known before its deployment (e.g., how high the camera is positioned or mounted on the ceiling or other structure). When multiple cameras are implemented as an array within a scene or environment (e.g., within a room, hall, garage, or any other location), stitching the image data together from all the cameras to build a mesh can be problematic since the height of each camera within the array is unknown. Meshes are important for various camera system functionalities, such as obtaining continuous visibility of a scene based on the field of view (FOV) of each camera to track objects of interest. To build the mesh properly, the camera's height is a factor needed to build the mesh/mesh field of view based on the FOVs of the multiple cameras within the array.

BRIEF DESCRIPTION OF THE DRAWINGS

Details of one or more aspects of the subject matter described in this disclosure are outlined in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

Figure 1:
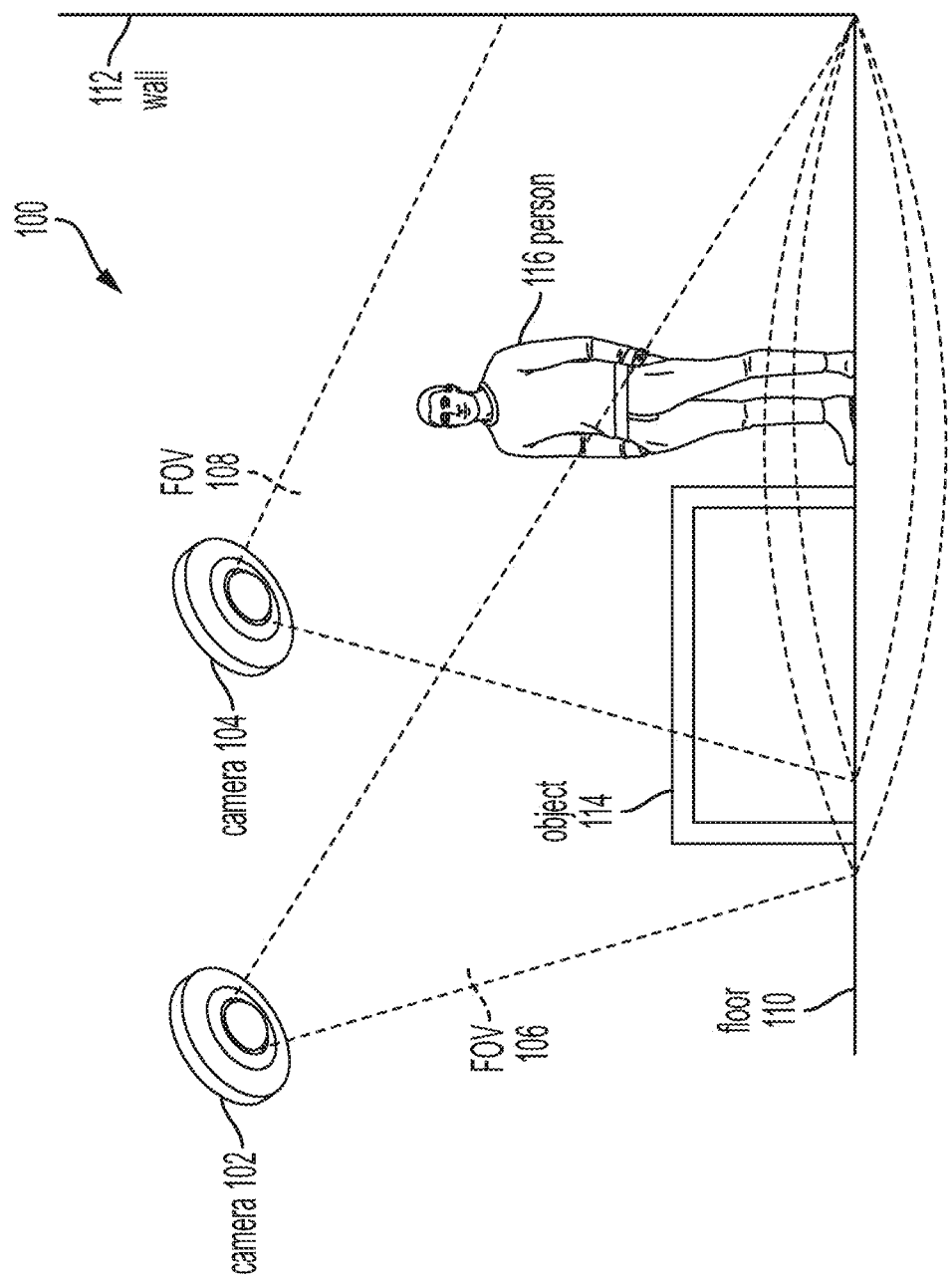
FIG. 1 illustrates an example camera system architecture within an example environment, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

In one aspect, a method for camera height detection includes emitting a signal in an array of points. A reflected signal is received at a sensor, the reflected signal being a bounce back of the emitted signal from at least a subset of the array of points. Based on a time it takes to receive the reflected signal from each respective point in the array, a distance for each respective point is determined. A depth map from each respective point is generated, where the depth map provides distance measurements to objects within an environment of the camera, and a vertical position of the camera is determined based on the depth map.

In another aspect, an overlapping area of pixels of a first output of the camera and a second output of at least a second camera within an array of cameras is determined, and a mesh of the array of cameras is generated by stitching together the first output of the camera with the second output of the at least second camera based on the overlapping area.

In another aspect, the reflected signal from each respective point in the array with a machine-learned (ML) model is analyzed. Based on the ML model, an object type is assigned to the objects within the environment of the camera. An estimated depth map distribution is determined in accordance with the object types at one or more distances, a measured depth map distribution of the objects is matched with the estimated depth map distribution, and based on a match, the vertical position of the camera is determined.

In another aspect, reflected signals captured by a camera positioned at a known height are received. A training depth map from each respective point in the array is generated, and an ML model is trained based on the training depth map, where the ML model is generated from an analysis of the training depth map that identifies one or more depth map features that correspond to an object type, an object distance, an object size, and a respective object distribution within the depth map.

In another aspect, based on a change in depth value of a subset of points within the array, an object is detected to have entered the environment of the camera. Based on the detection of the object, an initiation of one or more image analysis services of the camera are triggered.

In another aspect, based on a change in depth value of a subset of points within the array, an object is detected as moving within the environment of the camera. Based on the detection of movement of the object, a tracking service is triggered that initiates one or more image analysis services of the camera and any adjacent cameras capturing scenes of the environment.

In another aspect, each respective point within the reflected signal is compared against a threshold height, and any points below a threshold value are detected as an obstruction between the camera and a floor of the environment.

In one aspect, a computing apparatus includes a processor and a memory storing instructions that, when executed by the processor, configure the apparatus to emit a signal in an array of points, receive a reflected signal at a sensor, where the reflected signal is a bounce back of the emitted signal from at least a subset of the array of points, and based on a time it takes to receive the reflected signal from each respective point in the array, determine a distance for each respective point. A depth map from each respective point is generated, where the depth map providing distance measurements to objects within an environment of the camera. A vertical position of the camera is determined based on the depth map.

In another aspect, the instructions further configure the apparatus to determine an overlapping area of pixels of a first output of the camera and a second output of at least a second camera within an array of cameras. A mesh of the array of cameras is generated by stitching together the first output of the camera with the second output of the at least second camera based on the overlapping area.

In another aspect, the instructions further configure the apparatus to analyze the reflected signal from each respective point in the array with a machine-learned (ML) model. Based on the ML model, an object type is assigned to the objects within the environment of the camera. An estimated depth map distribution is determined in accordance with the object types at one or more distances, a measured depth map distribution of the objects is matched with the estimated depth map distribution, and based on a match, the vertical position of the camera is determined.

In another aspect, the instructions further configure the apparatus to receive reflected signals captured by a camera positioned at a known height. A training depth map from each respective point in the array is generated, and an ML model is trained based on the training depth map, where the ML model is generated from an analysis of the training depth map that identifies one or more depth map features that correspond to an object type, an object distance, an object size, and a respective object distribution within the depth map.

In another aspect, the instructions further configure the apparatus to detect, based on a change in depth value of a subset of points within the array, that an object has entered the environment of the camera. Based on the detection of the object, an initiation of one or more image analysis services of the camera are triggered.

In another aspect, the instructions further configure the apparatus to, based on a change in depth value of a subset of points within the array, detect an object as moving within the environment of the camera. Based on the detection of movement of the object, a tracking service is triggered that initiates one or more image analysis services of the camera and any adjacent cameras capturing scenes of the environment.

In another aspect, the instructions further configure the apparatus to compare each respective point within the reflected signal against a threshold height, and any points below a threshold value are detected as an obstruction between the camera and a floor of the environment.

In one aspect, a non-transitory computer-readable storage medium includes instructions that when executed by a computer, cause the computer to emit a signal in an array of points, receive a reflected signal at a sensor, where the reflected signal is a bounce back of the emitted signal from at least a subset of the array of points, and based on a time it takes to receive the reflected signal from each respective point in the array, determine a distance for each respective point. A depth map from each respective point is generated, where the depth map providing distance measurements to objects within an environment of the camera. A vertical position of the camera is determined based on the depth map.

In another aspect, the instructions further configure the computer to determine an overlapping area of pixels of a first output of the camera and a second output of at least a second camera within an array of cameras. A mesh of the array of cameras is generated by stitching together the first output of the camera with the second output of the at least second camera based on the overlapping area.

In another aspect, the instructions further configure the computer to analyze the reflected signal from each respective point in the array with a machine-learned (ML) model. Based on the ML model, an object type is assigned to the objects within the environment of the camera. An estimated depth map distribution is determined in accordance with the object types at one or more distances, a measured depth map distribution of the objects is matched with the estimated depth map distribution, and based on a match, the vertical position of the camera is determined.

In another aspect, the instructions further configure the computer to receive reflected signals captured by a camera positioned at a known height. A training depth map from each respective point in the array is generated, and an ML model is trained based on the training depth map, where the ML model is generated from an analysis of the training depth map that identifies one or more depth map features that correspond to an object type, an object distance, an object size, and a respective object distribution within the depth map.

In another aspect, the instructions further configure the computer to detect, based on a change in depth value of a subset of points within the array, that an object has entered the environment of the camera. Based on the detection of the object, an initiation of one or more image analysis services of the camera are triggered.

In another aspect, the instructions further configure the computer to, based on a change in depth value of a subset of points within the array, detect an object as moving within the environment of the camera. Based on the detection of movement of the object, a tracking service is triggered that initiates one or more image analysis services of the camera and any adjacent cameras capturing scenes of the environment.

DESCRIPTION OF EXAMPLE EMBODIMENTS

FIG. 1 illustrates an example camera system 100 within an example environment, in accordance with some examples. Although the example camera system 100 depicts a particular set of devices and example environment, the devices within camera system 100 may be altered without departing from the scope of the present disclosure. For example, some of the devices and device operations depicted may be performed in parallel or in a different sequence that does not materially affect the function of the camera system 100. In other examples, different components of an example device or system that implements the functionalities depicted within camera system 100 may perform functions at substantially the same time or in a specific sequence.

Methods and systems are disclosed for detecting camera height based on one or more time of flight (TOF) sensors. As shown in the camera system 100, camera 102 and camera 104 are deployed above a region of a scene, or environment, to be recorded by camera 102 and camera 104. For example, camera 102 and/or camera 104 can be placed on a ceiling or wall or suspended from the ceiling on a chain or by other methods. While the example embodiment shown deploys two cameras (e.g., camera 102 and camera 104) that comprise the array of cameras within camera system 100, other embodiments may include only one camera or any number of cameras. Additionally, in the example shown, while camera 102 and camera 104 comprise an array of fisheye cameras (e.g., including one or more fisheye lenses as camera component(s) used for shooting wide angles), any type of camera may be used that does not materially affect the function of the camera system 100. Camera 102 and/or camera 104 can include variations of fisheye lenses, such as full-frame, circular, "super wide," and/or "ultra-wide" lenses.

Fisheye cameras, known for their wide angle lenses, typically produce warped images (e.g., having the fisheye effect) capable of providing video surveillance with dynamic viewing angles, including panoramic 180 and 360 degrees FOV. In addition to their signature broad, panoramic view that covers large areas, fisheye surveillance cameras are also capable of providing greater situational awareness to reduce potential blind spots with the ability to create split views in different directions to increase coverage without having to install additional cameras. However, measuring a fisheye camera's height can be problematic due to its warped image effects.

TOF sensors can be deployed to measure the height of these cameras. For example, one or more TOF sensors can be placed on camera 102 and camera 104, which are designed to point down towards the scene or environment to be captured by the camera array. In some embodiments, the TOF sensor on camera 102 and camera 104 is teardrop-shaped to best emit, receive, and/or process photons for distance measurement, although the TOF sensor can be in any appropriate shape. The TOF sensor may emit a signal in an array of points (e.g., with dimensions of eight by eight pixels) towards the scene below camera 102 and camera 104. In some embodiments, the signal may be emitted commensurate with each cameras field of view (FOV), which is the extent of the observable world that is seen by each camera at any given moment. For example, the array of points emitted by camera 102 can correspond to the cone-shaped area of FOV 106, while another array of points emitted by camera 104 can correspond to the cone-shaped area of FOV 108.

The array of points can be used to determine the camera's distance to the floor or a physical surface in the opposite direction (relative to the camera). For example, the scene below camera 102 and camera 103 displays an example environment that includes floor 110, wall 112, object 114 (e.g., a table or similar piece of furniture), and person 116. Once emitted by the TOF sensor, the array of points (e.g., the photons emitted within the signal) will bounce off any objects and return to the TOF sensor. Based on receiving the reflected signal at the TOF sensor, camera 104 can use the array of points within FOV 108 to determine the distances of objects relative to the camera 104. For example, a distance for each point within FOV 108 between an object and camera 104 can be determined based on the time difference between the emission of the signal and its return to the TOF sensor. In some embodiments, the time it takes to receive the reflected signal from each respective point in the array is a measurement of an actual time-of-flight of a photon within the signal. In some embodiments, the distance for each individual point in the array is based on using timed pulse techniques, where the distance of the object is deduced using the speed of light to calculate the distance traveled by the signal. Additionally and/or alternatively, the distance for each respective point in the array can be further based on a determination of a phase shift of the reflected signal, where the phase shift can be based on a material of the objects within the environment of the camera (e.g., the phase shift is greater for certain materials than others).

Regardless of which technique is used, providing a light source capable of illuminating the scene allows the TOF sensor to determine the depth of all points within the camera's FOV. This gives a range map where each pixel encodes the distance to the corresponding point on the scene. For example, a depth map for objects within camera 104's view can be generated from each respective point within FOV 108, where the depth map provides distance measurements to entities within an environment of the camera. In the example shown, the TOF sensor on camera 104 can generate a depth map showing distances to floor 110, wall 112, object 114, and person 116. Similarly, the TOF sensor on camera 102 can create a depth map showing distances to floor 110, object 114, and person 116, but not to wall 112 since it is out of FOV 106.

A vertical position of camera 102 and/or camera 104 can be determined based on the depth map. For example, camera 102 can use the array of points to determine the greatest distance relative to the camera. The greatest distance in this example can be used to eliminate or exclude any obstructions (e.g., shelving, furniture, etc., such as object 114 and person 116) that may be present within the scene. As a result, the distance from camera 102 to floor 110 or a surface in the environment (e.g., wall 112 if within the FOV) can be measured efficiently and with high accuracy. Similarly, the distance is measured from camera 104 to floor 110 and/or wall 112. This gives the height of camera 102 and the height of camera 104.

In some embodiments, the data from the TOF sensor, which gives the relative heights of camera 102 and camera 104, can be used to improve the algorithms of the cameras, such as an algorithm for stitching the cameras (and/or the camera FOVs) into a mesh, tracking and/or object detection algorithm, etc. Furthermore, the relative position of the cameras and characteristics of the camera positions (e.g., angled deployment, sloped ceiling, etc.) can also be determined and used to determine the height and FOVs of cameras more accurately. For example, camera system 100 can receive a signal from an accelerometer on camera 102 and/or camera 104 that measures a degree of tilt of the respective camera. Based on the degree of tilt, distance measurements to objects within the camera's environment are corrected within the depth map. Moreover, the measured data can be compared against a threshold so that if the height is measured as too low, the camera system 100 will assume that there is an obstruction between the camera and the floor (e.g., an obstacle such as object 114 or person 116). In these cases, such data can be ignored as irrelevant.

Figure 2:
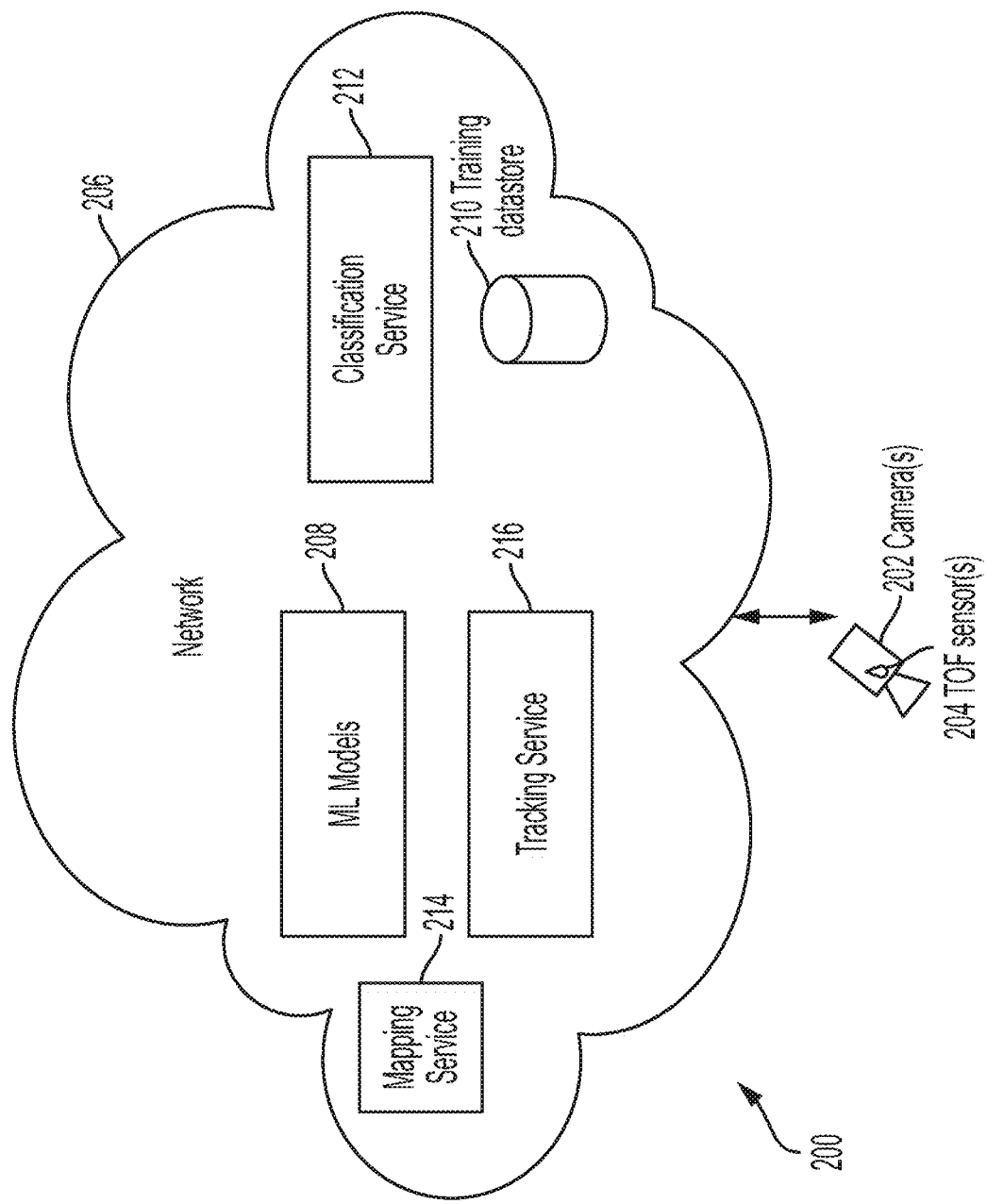
FIG. 2 illustrates an example representation of a network environment in which an array of cameras operate, in accordance with some examples.

FIG. 2 illustrates an example representation of a network environment in which an array of cameras operate, in accordance with some examples. In system 200, camera(s) 202 include one or more TOF sensors 204. As discussed above in FIG. 1, the TOF sensor(s) 204 can emit a signal in an array of points, and the difference in time between emitting the signal and receiving its bounce back from an object measures the distance to the object. Each camera's vertical position—or height—can be determined from these depth measurements.

Network 206 includes various functionalities that, in the example embodiment, are performed in one or more nodes within a wireless network. However, other example embodiments may perform all or a subset of the functionalities discussed below within the camera(s) 202 (e.g., local to the camera device). In network 206, the reflected signal from each respective point in the array is analyzed using one or more machine-learned (ML) models 208. The ML models 208 can, and are configured to, assign an object type to any objects within the environment of the camera. For example, classification service 212 determines an estimated depth value distribution within a depth map in accordance with the object types at one or more distances. The classification service 212 can generate the estimated depth map distribution based on historical data of the current environment and/or on trained data using historical depth map distributions of known objects at known distances. For example, based on the example embodiment in FIG. 1, classification service 212 can include one or more depth map distributions with signatures within the TOF sensor data that indicate object 114 is a table and person 116 is a human being. The signatures may also include one or more characteristics of the objects, such as whether an object is stationary, moving, or moveable, type of furniture, age or demographic characteristics of the person (e.g., a child vs. an adult, gender, age, etc.), etc.

The ML model 208 may match the objects' measured depth map distribution with the estimated depth map distribution signatures from the classification service 212. This match can then be output to the mapping service 214, which generates the depth map of the current scene captured by the camera(s) 202. Based on the depth map distribution matches from the ML model 208, the mapping service 214 can determine the vertical position (e.g., height) of each camera (s) 202.

Additionally and/or alternatively, the ML model 208 can be trained using historical TOF sensor data within training datastore 210. For example, system 200 can receive, either from the camera(s) 202 or a specific camera designed to capture training data, reflected signals captured by the camera positioned at a known height. Mapping service 214 can generate, based on the received reflected signals, a training depth map from each respective point in the array. This depth map then trains the ML model 208 based on the training depth map. The ML model 208 can identify one or more training depth map features that correspond to a known object type, object distance, object size, and a respective object distribution within the training depth map. The ML model 208 analysis can be output to classification service 212 to generate depth map distribution signatures (or modify existing ones to improve classification service 212 accuracies) for later use by the camera(s) 202. Furthermore, in some cases, a camera can be trained with training data (e.g., training datastore 210) captured by a camera 202 positioned (e.g., mounted, etc.) at a known height. The data from the TOF sensor 204 can also be used in conjunction with data from other sensors (e.g., optical image data from image sensors, data from inertial measurement units, etc.) to increase the quality of the training data within training datastore 210.

In some examples, a tracking service 216 can be triggered when classification service 212 identifies a person (or another moveable object) to be tracked. For example, the mapping service 214 can stitch the data together from all the camera(s) 202 within the array of cameras, such that an entire scene is seamlessly blended into one depth map. Based on a change in depth value of a subset of points within the array, the tracking service 216 can detect that an object—such as a person—has entered the camera environment or is moving within the environment/scene. Detecting the moving person can trigger the initiation of one or more image analysis services of the camera 202 and any adjacent cameras capturing scenes of the environment, allowing the ability to track the person as they move from one camera's FOV to another camera's FOV.

Figure 3:
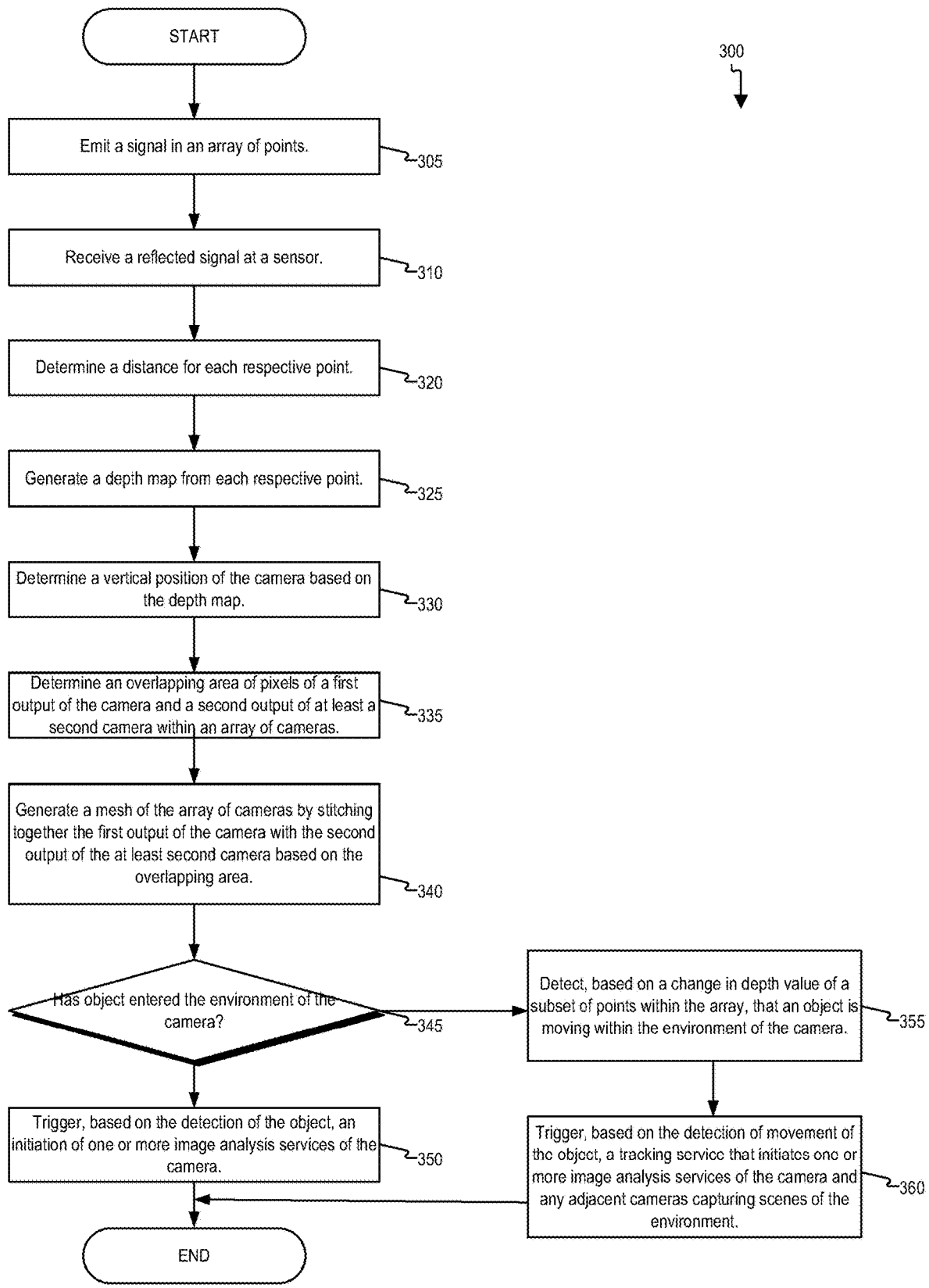
FIG. 3 shows a flow diagram for calculating the vertical position (e.g., height) of camera deployments in an environment and using the vertical positions to build camera meshes.

FIG. 3 illustrates an example method 300 for using TOF sensors to calculate the vertical position (e.g., height) of camera deployments in an environment and using the vertical positions to build camera meshes. Although the example method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements method 300 may perform functions at substantially the same time or in a specific sequence.

According to some examples, the method includes emitting a signal in an array of points at block 305. For example, the TOF sensor(s) 204 illustrated in FIG. 2 may emit a signal in an array of points. The signal, for example, can be emitted downwards towards a scene in an array of points (e.g., 8×8 or as a multizone sensor in a 4×4 matrix) below the camera array. In some embodiments, the signal may be emitted commensurate with each camera's field of view (FOV), which is the extent of the observable world seen by each camera at any given moment. The array of points (e.g., the photons emitted within the signal) will bounce off any objects within the scene and return to the TOF sensor(s) 204.

According to some examples, method 300 includes receiving the reflected signal at a sensor at block 310. For example, the TOF sensor(s) 204 illustrated in FIG. 2 may receive the reflected signal, where the reflected signal is the bounce back of the emitted signal from at least a subset of the array of points that correspond to an occluding object. The object could be the floor, wall, and/or stationary or moveable objects within the scene, such as (but not limited to): people, furniture (e.g., tables, chairs, shelves, etc.), pets, animals, cars, etc.

According to some examples, method 300 includes determining a distance for each respective point at block 320. For example, based on a time it takes to receive the reflected signal from each individual point in the array, the mapping service 214 illustrated in FIG. 2 may determine a distance for each respective point within the scene. In some embodiments, the mapping service 214 may determine the distance based on the measured phase shift of the reflected signal, which can be found on a material of the objects within the camera's environment. In some embodiments, the mapping service 214 may determine the distance based on the time it takes to receive the reflected signal after being emitted by the TOF sensor, where each respective point in the array is a measurement of an actual time-of-flight of a photon within the signal. In some embodiments, the mapping service 214 may determine the distance based on a field of view of the camera in combination with a map of the environment. For example, comparing what is seen within the panoramic view of an image taken by the camera with a map of the building (e.g., knowing the relative position of specific features within the scene, such as furniture layout, stairwells, elevators, office doors, etc.) can provide information about the vertical position of the camera, since more of the scene will be captured within a view the higher up the camera is positioned.

According to some examples, method 300 includes generating a depth map from each respective point at block 325. For example, the mapping service 214 illustrated in FIG. 2 may create the depth map by determining the depth of all points within the array. The results of this, for example, give a range map where each pixel encodes the distance to the corresponding point on the scene. For example, a depth map for objects within camera 104's view (illustrated in FIG. 1) can be generated from each respective point within FOV 108, where the depth map provides distance measurements to objects within an environment of the camera. In the example shown, the TOF sensor on camera 104 can generate a depth map showing distances to floor 110, wall 112, object 114, and person 116. Similarly, the TOF sensor on camera 102 can create a depth map showing distances to floor 110, object 114, and person 116, but not to wall 112 since it is out of FOV 106.

According to some examples, method 300 includes determining the vertical position of the camera based on the depth map at block 330. For example, the mapping service 214 illustrated in FIG. 2 may determine a vertical position of the camera based on an analysis of the depth map. For instance, in some embodiments, any points below a threshold value are detected as being an obstruction between the camera and a floor of the environment, and those points are thrown out of the height determination. In some embodiments, each respective point within the reflected signal is compared against a threshold height. Any points below the threshold are thrown out of the height determination. The measurements of depth to the floor and/or a wall are of the most interest in determining the vertical position of the camera.

In some embodiments, method 300 can increase the chances of generating an accurate measurement of the camera height. For example, the signal can be triggered to be emitted during a period of time in which sources of interference are decreased, such as after business hours or during low traffic time periods when the chance of people being within the environment (and thus interfering in floor and/or wall depth measurements from the TOF sensor) has decreased. In some embodiments, the depth map can generate a 3D visualization of object distancing within the environment since the depth map provides distance measurements to all the observable objects within an environment of the camera view.

Additionally and/or alternatively, according to some examples, method 300 can include generating a mesh of an array of one or more fisheye cameras, where the images from each camera in the array are stitched together, by determining an overlapping area of pixels of a first output of the camera and a second output of at least a second camera within an array of cameras at block 335. For example, the mapping service 214 illustrated in FIG. 2 may determine an overlapping area of pixels of a first output of the camera and a second output of at least a second camera within an array of cameras 202. In some embodiments, the overlapping area of pixels can be based on an identification of an object that appears in more than one camera view over time. For example, the classification service 212 illustrated in FIG. 2 may determine an estimated depth map distribution in accordance with the object types. The classification service 212 can generate the estimated depth map distribution based on historical data of the current environment, and/or on trained data using historical depth map distributions of known objects at known distances. For example, based on the example embodiment in FIG. 1, classification service 212 can include one or more depth map distributions with signatures within the TOF sensor data that indicate object 114 is a table and person 116 is a human being. The signatures may also include one or more characteristics of the objects, such as whether an object is stationary, moving or moveable, type of furniture, age or demographic characteristics of the person (e.g., a child vs an adult, gender, age, etc.), etc.

According to some examples, method 300 can generate the mesh of the array of cameras by stitching together the first output of the camera with the second output of the at least second camera based on the overlapping area at block 340. For example, the mapping service 214 illustrated in FIG. 2 may generate a mesh of the array of cameras 202 by stitching together the first output of the camera with the second output of the at least second camera based on the overlapping area.

According to some examples, the method 300 can include a trigger mechanism for initiating image analysis or alerting a system that an object (such as a person) has entered the FOV of one of the cameras 202 within the array. For example, method 300 includes decision 345, in which it is determined whether an object has entered the environment of the cameras 202. There can be at least three scenarios of triggering image analysis.

If no object has entered the environment of the camera, then no action is taken and the method 300 ends.

If an object is detected, then one or more of the following techniques can be used based on whether the object is stationary or moving into the FOV of another camera. For example, for a stationary object, the mapping service 214 can detect a type of an object based on the depth value features of a subset of points within the array. For example, based on the features of an object type output by classification service 212 illustrated in FIG. 2, the mapping service 214 and/or ML models 208 can determine that a person is within the FOV 106 of camera 102, even if the person is stationary (e.g., hiding). As a result, method 300 can trigger, based on the detection of the stationary person, an initiation of one or more image analysis services of the camera at block 350. For example, the mapping service 214 illustrated in FIG. 2 may trigger, based on the detection of the object of interest, an initiation of one or more image analysis services of the cameras 202.

For a moving object, the mapping service 214 can detect the moving object based on a change in depth value of a subset of points within the array. For example, the FOV 106 for camera 102 illustrated in FIG. 1 may detect, based on an analysis by mapping service 214 and/or ML models 208, that an object has entered the environment of the camera based on a change in depth value of a subset of points within the array of cameras 202 at block 355. For example, the mapping service 214 illustrated in FIG. 2 may detect, based on a change in depth value of a subset of points within the array, that an object is moving within the environment of camera 102 and will, in about 10 seconds time, reach the environment within the view of camera 104.

According to some examples, the method 300 includes triggering, based on the detection of movement of the object, a tracking service that initiates one or more image analysis services of the camera and any adjacent cameras within the array of cameras 202 capturing scenes of the environment at block 360. For example, the mapping service 214 illustrated in FIG. 2 may trigger, based on the detection of movement of the object, a tracking service 216 that initiates one or more image analysis services of the camera and any adjacent cameras capturing scenes of the environment.

Figure 4:
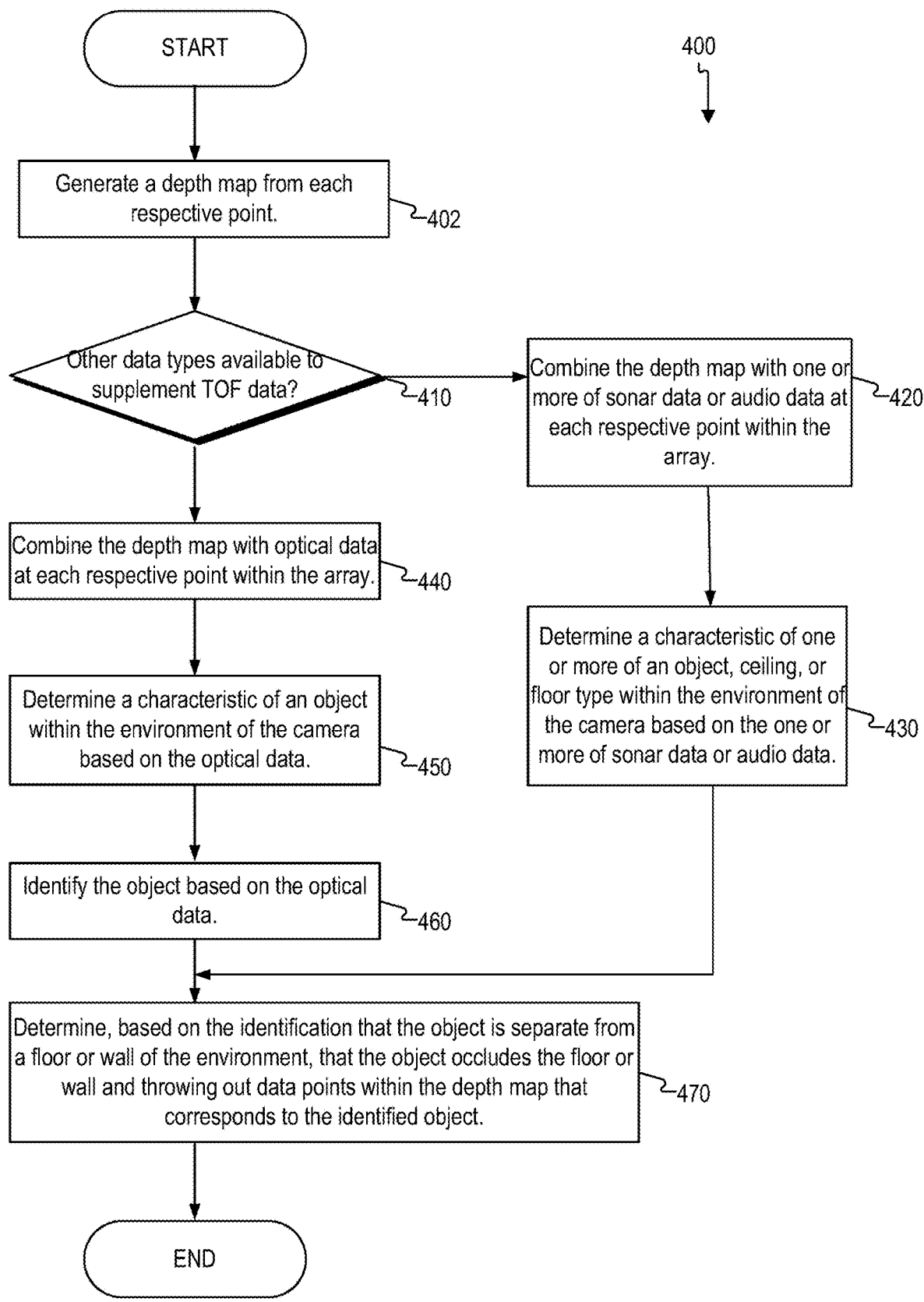
FIG. 4 shows a flow diagram for combining TOF sensor data with other data types to improve the accuracy of a mapping service.

FIG. 4 illustrates an example method 400 for combining TOF sensor data with other data types to improve the accuracy of the mapping service. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes generating a depth map from each respective data point captured by the one or more cameras within an array of cameras at block 402. For example, the mapping service 214 illustrated in FIG. 2 may generate a depth map from each respective point.

According to some examples, the method 400 includes determining if optical data, sonar data, audio data, or other data types are available to supplement the TOF data at decision 410. If not, method 400 ends. If optical data is available to supplement the TOF data (e.g., an optical image corresponding to the FOV captured by the TOF data), then the depth map can be combined with the optical data at each respective point within the array at block 440. For example, the mapping service 214 illustrated in FIG. 2 may combine the depth map with optical data (e.g., overlay the optical image on top of the TOF data) at each respective data point within the array.

According to some examples, the method 400 includes determining a characteristic of an object within the environment of the camera based on the optical data at block 450. For example, the classification service 212 illustrated in FIG. 2 may determine a characteristic of an object within the environment of the camera based on the optical data.

According to some examples, the method 400 includes identifying the object based on the optical data at block 460. For example, the mapping service 214 may take the classification service 212 features as input to identify the object based on the optical data.

According to some examples, the method 400 includes determining, based on the identification that the object is separate from a floor or wall of the environment (e.g., the object type is a person or a piece of furniture instead of a floor or wall), that the object occludes the floor or wall, and then throwing out data points within the depth map that corresponds to the identified object at block 470. For example, the mapping service 214 illustrated in FIG. 2 may determine, based on the identification that the object is separate from a floor or wall of the environment, that the object occludes the floor or wall and throwing out data points within the depth map that corresponds to the identified object. For example, an erroneous or absent value of a depth value at a specific point within the array of image points can be modified based on aligning the depth map with the optical data. In other words, the optical image can be overlayed on top of the TOF sensor data (e.g., the depth map), and if it is known that a subset of pixels correspond to a person within the optical image, then the depth map can be corrected to reflect depth values corresponding to a person within its corresponding depth values within the depth map.

Additionally and/or alternatively, if sonar data and/or audio data are available to supplement the TOF data, then according to some examples, the method 400 includes combining the depth map with one or more of sonar data or audio data at each respective point within the array at block 420. For example, the mapping service 214 illustrated in FIG. 2 may combine the depth map with one or more of sonar data or audio data at each respective point within the array.

According to some examples, the method 400 can include determining a characteristic of one or more of an object, ceiling, or floor type within the environment of the camera based on the one or more of sonar data or audio data at block 430. For example, the classification service 212 and/or ML models 208 illustrated in FIG. 2 may determine a characteristic of one or more of an object, ceiling, or floor type within the environment of the camera based on the one or more of sonar data or audio data. An erroneous or absent value of a depth at a specific point within the array of points within the depth map can be modified based on aligning the depth map with the one or more of sonar data or audio data.

According to some examples, the method 400 includes determining, based on the identification that the object is separate from a floor or wall of the environment, that the object occludes the floor or wall and throwing out data points within the depth map that corresponds to the identified object at block 470. For example, the mapping service 214 illustrated in FIG. 2 may determine, based on the identification that the object is separate from a floor or wall of the environment, that the object occludes the floor or wall and the throw out those data points within the depth map that corresponds to the identified object.

Figure 5:
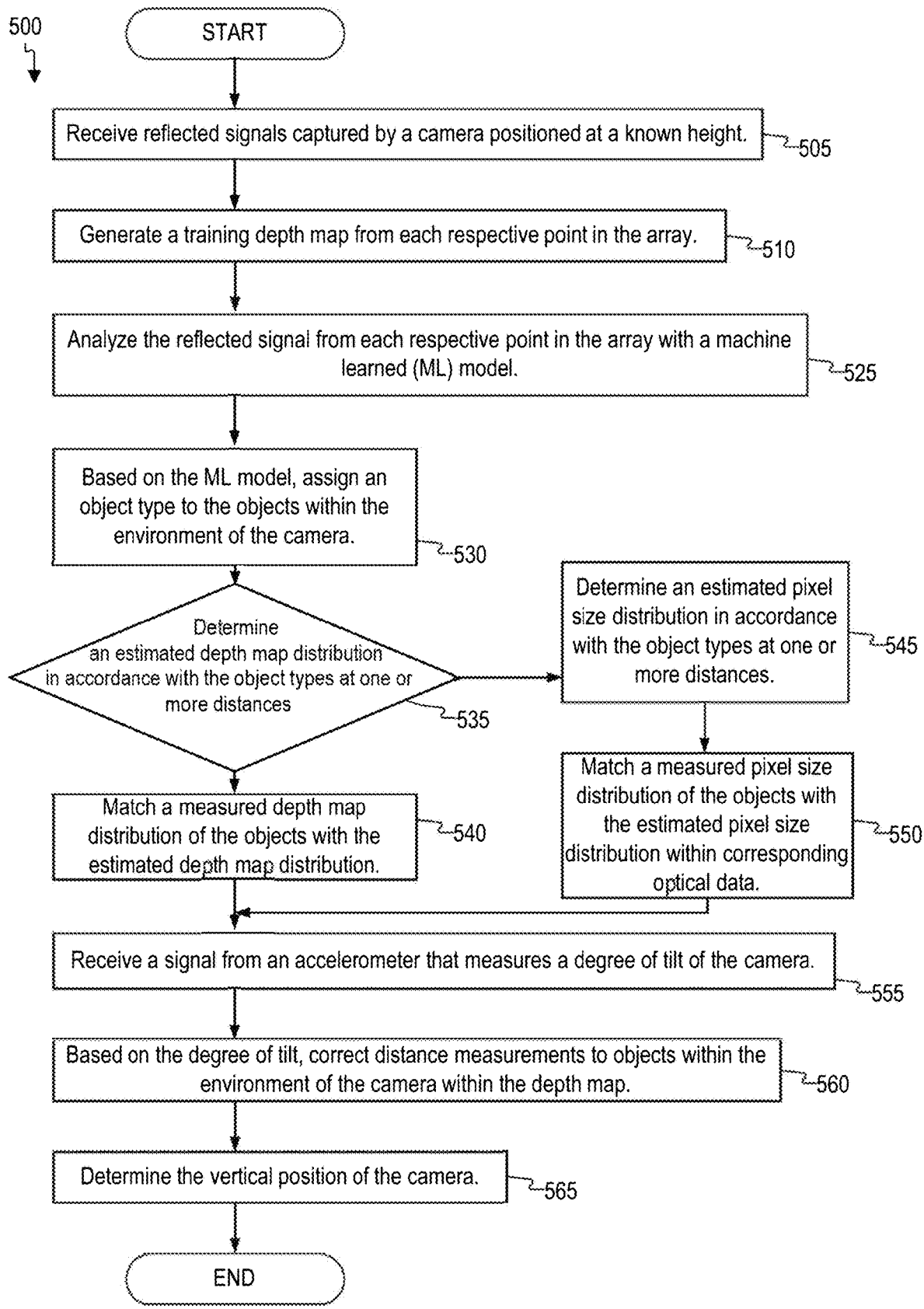
FIG. 5 shows a flow diagram for training and applying one or more ML models for depth map generation.

FIG. 5 illustrates an example method 500 for training and applying one or more ML models for depth map generation. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method 500 includes receiving reflected signals captured by a camera positioned at a known height at block 505 (e.g., the signals emitted from the TOF sensor). For example, a TOF sensor on camera 102 illustrated in FIG. 1 may emit a signal covering FOV 106 which, when it hits an object, floor, or wall, bounces back to be captured by the TOF sensor. The difference in time between the emitted and received reflected signal provides a measurement of the distance to the object, floor, or wall.

In order to train one or more ML models, method 500 can receive the reflected signals by a camera positioned at a known height. Based on the data received by the camera at the known height, ML models 208 illustrated in FIG. 2 can generate a training depth map from each respective point in the array at block 510. For example, the ML models 208 can be trained based on identifying one or more features within the TOF sensor data that indicate an object distance, an object size, and/or a respective object distribution within the depth map. The ML models 208 can furthermore be generated from an analysis of the training depth map that identifies one or more depth map features that correspond to an object type. In some embodiments, the features identified within the training depth map can be input into the classification service 212, which can then apply these features to future datasets from the TOF sensor.

Once the training depth map generates and/or modifies the ML models 208 (e.g., trains ML models 208), the ML models 208 are used to analyze the reflected signal of camera 102 and/or camera 104 from each respective point in the array at block 525. Based on the ML model analysis, an object type is assigned to the objects within the environment of the camera at block 530. For example, the object 115 is assigned to be a person, while object 114 is assigned as a piece of furniture.

According to some examples, the method 500 includes determining an estimated depth map distribution in accordance with the object types at one or more distances at block 535. For example, the mapping service 214 illustrated in FIG. 2 may determine an estimated depth map distribution in accordance with the object types at one or more distances (e.g., object 114 is 15-16 feet away from camera 102, while person 116 is 16-17 feet away from camera 102, wall 112 is about 25 feet away from camera 102, and floor 110 is about 12-25 feet away from camera 102).

According to some examples, the method 500 includes matching a measured depth map distribution of the objects with the estimated depth map distribution at block 540. For example, the ML models 208 illustrated in FIG. 2 may match a measured depth map distribution of the objects with the estimated depth map distribution.

Additionally and/or alternatively, according to some examples, optical data, sonar data, audio data, or other data types are available to supplement the TOF data. If so, then the method 500 includes determining an estimated pixel size distribution in accordance with the object types at one or more distances at block 545. The measured pixel size distribution of the objects are matched with the estimated pixel size distribution within corresponding optical data (and/or sonar, audio, or other data types) at block 550. For example, the mapping service 214 illustrated in FIG. 2 may match a measured pixel size distribution of the objects (e.g., from the TOF sensor) with the estimated pixel size distribution within corresponding optical data (and/or sonar, audio, or other data types).

According to some examples, the mapping service 214 can compensate for camera tilt. For example, the method 500 includes receiving a signal from an accelerometer that measures a degree of tilt of the camera at block 555. Based on the degree of tilt, distance measurements to objects within the environment of the camera are corrected within the depth map at block 560.

According to some examples, the method 500 concludes by determining the vertical position of the camera at block 565. For example, the mapping service 214 illustrated in FIG. 2 may generate a depth map. The depth map can include detected objects, walls, and/or the floor. The distance to the floor 110, for example, can provide the height (e.g., vertical position) of camera 102 and/or camera 104.

Figure 6:
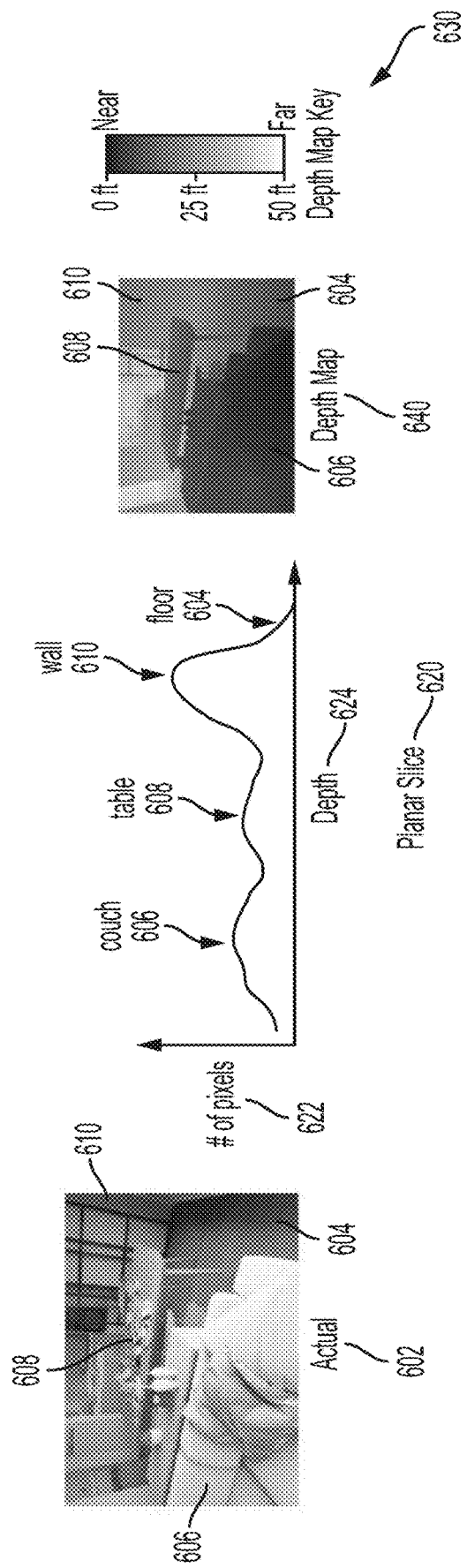
FIG. 6 illustrates a depth map process, including an example planar slice within a depth map, in accordance with some examples.

FIG. 6 illustrates a depth map process, including an example planar slice within a depth map, in accordance with some examples. Actual image 602 shows an actual representation of the environment to be captured by one or more cameras within a camera array. In some embodiments, the cameras may be a fisheye camera with a wide FOV. In some embodiments, actual image 602 is an optical image of the environment. Multiple objects are within the environment. For example, actual image 602 shows a couch 606, a table 608, a wall 610, and floor 604.

Planar slice 620 illustrates a slice of the depth map analysis. For example, the depth 624 is shown vs the number of pixels 622 at that depth value. Various signatures are shown within the depth map values, such as couch 606, table 608, wall 610, and floor 604. These values can correspond to shading within depth map key 630, which shows a gradation of values from near (e.g., 0 feet, the darkest shades) to the farthest values (e.g., 50 feet, the lightest shades).

These shade values are translated into depth map 640, which shows couch 606, table 608, wall 610, and floor 604 according to the shades within depth map key 630. Along with being a 3D representation of the environment, the depth map 640 and/or planar slice 620 can determine the vertical position (e.g., height) of the camera capturing the TOF sensor data. For example, the camera capturing the scene within depth map 640 can determine its height based on the measured distance to floor 604. In some embodiments, this is determined from the floor 604 signature displayed at a certain depth within planar slice 620.

Figure 7:
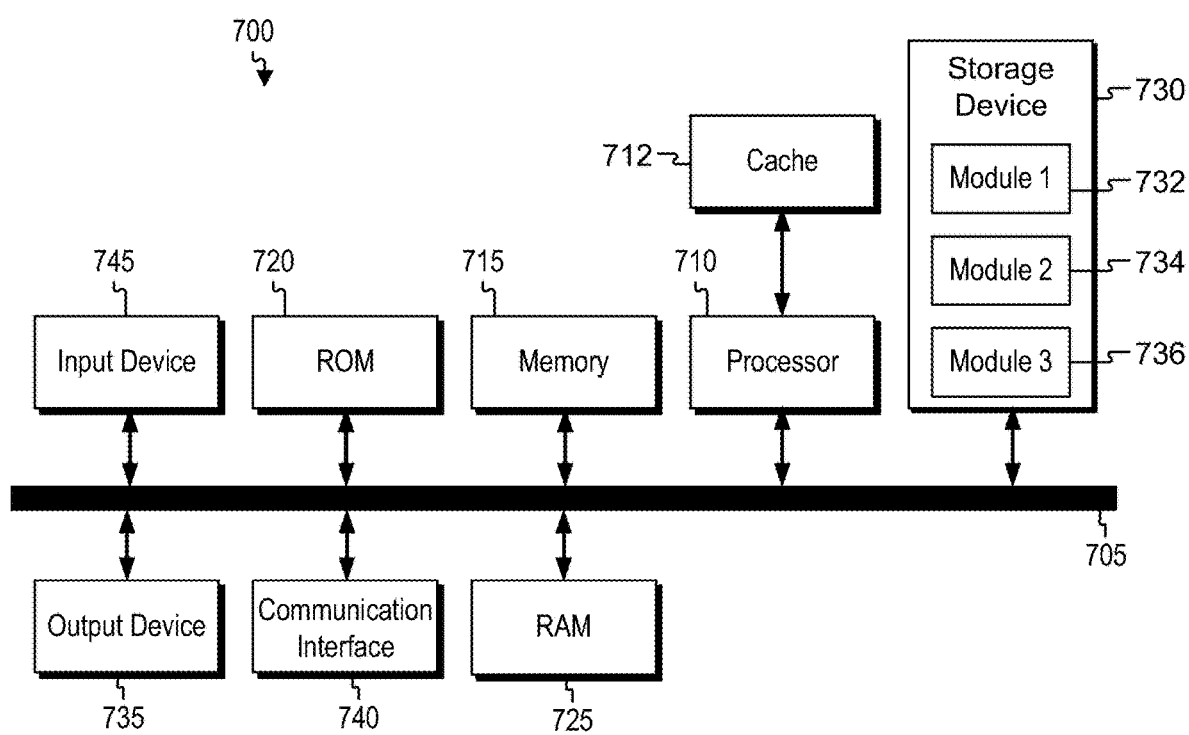
FIG. 7 shows an example of computing system 700, which can be for example any computing device that can implement components of the system.

FIG. 7 shows an example of computing system 700, which can be for example any computing device making up [[insert reference to one or more devices discussed earlier in the disclosure]] or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology are:

Aspect 1. A method for camera height detection comprising: emitting a signal in an array of points; receiving a reflected signal at a sensor, the reflected signal being a bounce back of the emitted signal from at least a subset of the array of points; based on a time it takes to receive the reflected signal from each respective point in the array, determining a distance for each respective point; generating a depth map from each respective point, the depth map providing distance measurements to objects within an environment of the camera; and determining a vertical position of the camera based on the depth map.

Aspect 2. The method of Aspect 1, wherein the time it takes to receive the reflected signal from each respective point in the array is a measurement of an actual time-of-flight of a photon within the signal.

Aspect 3. The method of any of Aspects 1 to 2, wherein the distance for each respective point in the array is further based on a determination of a phase shift of the reflected signal, the phase shift based on a material of the objects within the environment of the camera.

Aspect 4. The method of any of Aspects 1 to 3, the method further comprising: determining an overlapping area of pixels of a first output of the camera and a second output of at least a second camera within an array of cameras; and generating a mesh of the array of cameras by stitching together the first output of the camera with the second output of the at least second camera based on the overlapping area.

Aspect 5. The method of any of Aspects 1 to 4, wherein the distance for each respective point in the array is further based on a determination of a field of view of the camera in combination with a map of the environment.

Aspect 6. The method of any of Aspects 1 to 5, the method further comprising: combining the depth map with optical data at each respective point within the array; and determining a characteristic of an object within the environment of the camera based on the optical data, wherein an erroneous or absent value of a depth at a specific point within the array is modified based on aligning the depth map with the optical data.

Aspect 7. The method of any of Aspects 1 to 6, the method further comprising: identifying the object based on the optical data; and determining, based on the identification that the object is separate from a floor or wall of the environment, that the object occludes the floor or wall and throwing out data points within the depth map that corresponds to the identified object.

Aspect 8. The method of any of Aspects 1 to 7, the method further comprising: combining the depth map with one or more of sonar data or audio data at each respective point within the array; and determining a characteristic of one or more of an object, ceiling, or floor type within the environment of the camera based on the one or more of sonar data or audio data, wherein an erroneous or absent value of a depth at a specific point within the array is modified based on aligning the depth map with the one or more of sonar data or audio data.

Aspect 9. The method of any of Aspects 1 to 8, the method further comprising: receiving a signal from an accelerometer that measures a degree of tilt of the camera; and based on the degree of tilt, correcting distance measurements to objects within the environment of the camera within the depth map.

Aspect 10. The method of any of Aspects 1 to 9, the method further comprising: analyzing the reflected signal from each respective point in the array with a machine-learned (ML) model; based on the ML model, assigning an object type to the objects within the environment of the camera; determining an estimated depth map distribution in accordance with the object types at one or more distances; matching a measured depth map distribution of the objects with the estimated depth map distribution; and based on a match, determining the vertical position of the camera.

Aspect 11. The method of any of Aspects 1 to 10, the method further comprising: analyzing the reflected signal from each respective point in the array with a machine-learned (ML) model; based on the ML model, assigning an object type to the objects within the environment of the camera; determining an estimated pixel size distribution in accordance with the object types at one or more distances; matching a measured pixel size distribution of the objects with the estimated pixel size distribution within corresponding optical data; and based on a match, determining the vertical position of the camera.

Aspect 12. The method of any of Aspects 1 to 11, wherein the method further comprises: receiving reflected signals captured by a camera positioned at a known height; generating a training depth map from each respective point in the array; and training an ML model based on the training depth map, wherein the ML model is generated from an analysis of the training depth map that identifies one or more depth map features that correspond to an object type, an object distance, an object size, and a respective object distribution within the depth map.

Aspect 13. The method of any of Aspects 1 to 12, the method further comprising: detecting, based on a change in depth value of a subset of points within the array, that an object has entered the environment of the camera; and triggering, based on the detection of the object, an initiation of one or more image analysis services of the camera.

Aspect 14. The method of any of Aspects 1 to 13, the method further comprising: detecting, based on a change in depth value of a subset of points within the array, that an object is moving within the environment of the camera; triggering, based on the detection of movement of the object, a tracking service that initiates one or more image analysis services of the camera and any adjacent cameras capturing scenes of the environment.

Aspect 15. The method of any of Aspects 1 to 14, wherein each respective point within the reflected signal is compared against a threshold height; and wherein any points below a threshold value are detected as being an obstruction between the camera and a floor of the environment.

Aspect 16. The method of any of Aspects 1 to 15, wherein the signal is triggered to be emitted during a period of time in which sources of interference are decreased.

Aspect 17. The method of any of Aspects 1 to 16, wherein the signal is triggered to be emitted during a period of time in which a chance of people being within the environment has decreased.

Aspect 18. The method of any of Aspects 1 to 17, wherein the depth map generates a 3D visualization of object distancing within the environment.

What is claimed is:

1. A method for camera height detection comprising:
   emitting a signal in an array of points;
   receiving a reflected signal at a sensor, the reflected signal being a bounce back of the emitted signal from at least a subset of the array of points;
   based on a time it takes to receive the reflected signal from each respective point in the array, determining a distance for each respective point;

generating a depth map from each respective point, the depth map providing distance measurements to objects within an environment of the camera;

determining a vertical position of the camera based on the depth map;

determining an overlapping area of pixels of a first output of the camera and a second output of at least a second camera within an array of cameras; and generating a mesh of the array of cameras by stitching together the first output of the camera with the second output of the at least second camera based on the overlapping area and based on the vertical position of the camera as determined by the depth map.

2. The method of claim 1, the method further comprising:

analyzing the reflected signal from each respective point in the array with a machine-learned (ML) model;

based on the ML model, assigning an object type to the objects within the environment of the camera;

determining an estimated depth map distribution in accordance with the object types at one or more distances;

matching a measured depth map distribution of the objects with the estimated depth map distribution; and based on a match, confirming the vertical position of the camera.

3. The method of claim 1, wherein the method further comprises:

receiving reflected signals captured by a camera positioned at a known height;

generating a training depth map from each respective point in the array; and training an ML model based on the training depth map, wherein the ML model is generated from an analysis of the training depth map that identifies one or more depth map features that correspond to an object type, an object distance, an object size, and an object distribution within the depth map.

4. The method of claim 1, the method further comprising:

detecting, based on a change in depth value of a subset of points within the array, that an object has entered the environment of the camera; and triggering, based on the detection of the object, an initiation of one or more image analysis services of the camera.

5. The method of claim 1, the method further comprising:

detecting, based on a change in depth value of a subset of points within the array, that an object is moving within the environment of the camera; and triggering, based on the detection of movement of the object, a tracking service that initiates one or more image analysis services of the camera and any adjacent cameras capturing scenes of the environment.

6. The method of claim 1, wherein each respective point within the reflected signal is compared against a threshold height; and wherein any points below a threshold value are detected as an obstruction between the camera and a floor of the environment.

7. A computing apparatus comprising:

a processor; and a memory storing instructions that, when executed by the processor, configure the apparatus to:

emit a signal in an array of points;

receive a reflected signal at a sensor, the reflected signal being a bounce back of the emitted signal from at least a subset of the array of points;

based on a time it takes to receive the reflected signal from each respective point in the array, determine a distance for each respective point;

generate a depth map from each respective point, the depth map providing distance measurements to objects within an environment of the camera; and determine a vertical position of the camera based on the depth map;

determine an overlapping area of pixels of a first output of the camera and a second output of at least a second camera within an array of cameras; and generate a mesh of the array of cameras by stitching together the first output of the camera with the second output of the at least second camera based on the overlapping area and based on the vertical position of the camera as determined by the depth map.

8. The computing apparatus of claim 7, wherein the instructions further configure the apparatus to:

analyze the reflected signal from each respective point in the array with a machine-learned (ML) model;

based on the ML model, assign an object type to the objects within the environment of the camera;

determine an estimated depth map distribution in accordance with the object types at one or more distances;

match a measured depth map distribution of the objects with the estimated depth map distribution; and based on a match, confirm the vertical position of the camera.

9. The computing apparatus of claim 7, wherein the instructions further configure the apparatus to:

receive reflected signals captured by a camera positioned at a known height;

generate a training depth map from each respective point in the array; and train an ML model based on the training depth map, wherein the ML model is generated from an analysis of the training depth map that identifies one or more depth map features that correspond to an object type, an object distance, an object size, and an object distribution within the depth map.

10. The computing apparatus of claim 7, wherein the instructions further configure the apparatus to:

detect, based on a change in depth value of a subset of points within the array, that an object has entered the environment of the camera; and trigger, based on the detection of the object, an initiation of one or more image analysis services of the camera.

11. The computing apparatus of claim 7, wherein the instructions further configure the apparatus to:

detect, based on a change in depth value of a subset of points within the array, that an object is moving within the environment of the camera; and trigger, based on the detection of movement of the object, a tracking service that initiates one or more image analysis services of the camera and any adjacent cameras capturing scenes of the environment.

12. The computing apparatus of claim 7, wherein each respective point within the reflected signal is compared against a threshold height; and wherein any points below a threshold value are detected as an obstruction between the camera and a floor of the environment.

13. A non-transitory computer-readable storage medium, the computer-readable storage medium including instructions that when executed by a computer, cause the computer to:

emit a signal in an array of points;

receive a reflected signal at a sensor, the reflected signal being a bounce back of the emitted signal from at least a subset of the array of points;

based on a time it takes to receive the reflected signal from each respective point in the array, determine a distance for each respective point;

generate a depth map from each respective point, the depth map providing distance measurements to objects within an environment of the camera;

determine a vertical position of the camera based on the depth map determine an overlapping area of pixels of a first output of the camera and a second output of at least a second camera within an array of cameras; and generate a mesh of the array of cameras by stitching together the first output of the camera with the second output of the at least second camera based on the overlapping area and based on the vertical position of the camera as determined by the depth map.

14. The non-transitory computer-readable storage medium of claim 13, wherein the instructions further configure the computer to:

analyze the reflected signal from each respective point in the array with a machine-learned (ML) model;

based on the ML model, assign an object type to the objects within the environment of the camera;

determine an estimated depth map distribution in accordance with the object types at one or more distances;

match a measured depth map distribution of the objects with the estimated depth map distribution; and based on a match, confirm the vertical position of the camera.

15. The non-transitory computer-readable storage medium of claim 13, wherein the instructions further configure the computer to:

receive reflected signals captured by a camera positioned at a known height;

generate a training depth map from each respective point in the array; and train an ML model based on the training depth map, wherein the ML model is generated from an analysis of the training depth map that identifies one or more depth map features that correspond to an object type, an object distance, an object size, and an object distribution within the depth map.

16. The non-transitory computer-readable storage medium of claim 13, wherein the instructions further configure the computer to:

detect, based on a change in depth value of a subset of points within the array, that an object has entered the environment of the camera; and trigger, based on the detection of the object, an initiation of one or more image analysis services of the camera.

17. The non-transitory computer-readable storage medium of claim 13, wherein the instructions further configure the computer to:

detect, based on a change in depth value of a subset of points within the array, that an object is moving within the environment of the camera; and trigger, based on the detection of movement of the object, a tracking service that initiates one or more image analysis services of the camera and any adjacent cameras capturing scenes of the environment.

* * * * *